(12) United States Patent
Uno

(10) Patent No.: US 9,071,155 B2
(45) Date of Patent: Jun. 30, 2015

(54) SWITCHING POWER SUPPLY APPARATUS INCLUDING A PLURALITY OF OUTPUTS

(71) Applicant: Murata Manufacturing Co., Ltd., Nagaokakyo-shi, Kyoto-fu (JP)

(72) Inventor: Yoshiyuki Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/168,132

(22) Filed: Jan. 30, 2014

(65) Prior Publication Data

US 2014/0146577 A1 May 29, 2014

Related U.S. Application Data

(63) Continuation of application No. PCT/JP2012/069423, filed on Jul. 31, 2012.

(30) Foreign Application Priority Data

Aug. 4, 2011 (JP) .................................. 2011-170651

(51) Int. Cl.
*H02M 3/335* (2006.01)
*H02M 3/337* (2006.01)
*H02M 1/00* (2007.01)

(52) U.S. Cl.
CPC .......... *H02M 3/33561* (2013.01); *H02M 3/337* (2013.01); *Y02B 70/1433* (2013.01); *H02M 2001/0058* (2013.01); *Y02B 70/1491* (2013.01)

(58) Field of Classification Search
CPC .............. H02M 2001/0058; H02M 2001/0032
USPC .............. 363/16, 17, 19, 21.01–21.02, 21.07, 363/95–98, 127
See application file for complete search history.

(56) References Cited

U.S. PATENT DOCUMENTS 5,991,167 A * 11/1999 Van Lerberghe ................ 363/16
6,304,461 B1 * 10/2001 Walker ............................ 363/17
(Continued)

FOREIGN PATENT DOCUMENTS

JP 04-121181 U 10/1992
JP 06-303771 A 10/1994
(Continued)

OTHER PUBLICATIONS

Official Communication issued in International Patent Application No. PCT/JP2012/069423, mailed on Oct. 30, 2012.
(Continued)

*Primary Examiner* — Timothy J Dole
*Assistant Examiner* — Yusef Ahmed
(74) *Attorney, Agent, or Firm* — Keating & Bennett, LLP

(57) ABSTRACT

A resonant capacitor and an inductor are connected in series between a primary winding of a transformer and a second switching element. A first rectifying and smoothing circuit including a first rectifier switching element and a capacitor rectifies and smoothes a voltage generated in a first secondary winding of the transformer, and takes out a first output voltage. A second rectifying and smoothing circuit including a second rectifier switching element and a capacitor rectifies and smoothes a voltage generated in a second secondary winding of the transformer, and takes out a second output voltage. A control circuit controls an on-time of a first switching element and an on-time of the second switching element in accordance with the first output voltage and the second output voltage, respectively.

16 Claims, 12 Drawing Sheets

(56) References Cited

U.S. PATENT DOCUMENTS

| | | | |
|---|---|---|---|
| 6,545,883 B2* | 4/2003 | Xing et al. | 363/21.11 |
| 6,934,167 B2* | 8/2005 | Jang et al. | 363/21.02 |
| 7,184,280 B2* | 2/2007 | Sun et al. | 363/21.02 |
| 7,193,866 B1* | 3/2007 | Huang et al. | 363/22 |
| 7,446,512 B2* | 11/2008 | Nishihara et al. | 323/233 |
| 7,629,781 B2* | 12/2009 | Kyono | 323/267 |
| 8,040,696 B2* | 10/2011 | Wu et al. | 363/21.02 |
| 8,064,229 B2* | 11/2011 | Stuler | 363/21.06 |
| 8,089,784 B2* | 1/2012 | Choi | 363/25 |
| 8,134,851 B2* | 3/2012 | Soldano et al. | 363/127 |
| 8,189,355 B2* | 5/2012 | Kyono | 363/70 |
| 8,243,473 B2* | 8/2012 | Chen et al. | 363/16 |
| 8,400,787 B2* | 3/2013 | Wu et al. | 363/21.02 |
| 8,411,469 B2* | 4/2013 | Chen et al. | 363/21.06 |
| 8,416,597 B2* | 4/2013 | Adragna et al. | 363/127 |
| 8,542,501 B2* | 9/2013 | Kyono | 363/21.02 |
| 2001/0036087 A1* | 11/2001 | Raets et al. | 363/17 |
| 2002/0075698 A1* | 6/2002 | Kuranuki et al. | 363/17 |
| 2003/0081433 A1* | 5/2003 | Itakura et al. | 363/21.06 |
| 2003/0086282 A1* | 5/2003 | Zeng et al. | 363/95 |
| 2004/0052100 A1* | 3/2004 | Huang et al. | 363/125 |
| 2005/0068792 A1* | 3/2005 | Yasumura | 363/21.06 |
| 2006/0187686 A1* | 8/2006 | Sun et al. | 363/17 |
| 2007/0138870 A1 | 6/2007 | Kyono | |
| 2007/0263421 A1* | 11/2007 | Kyono | 363/127 |
| 2008/0144339 A1* | 6/2008 | Hsieh et al. | 363/21.02 |
| 2009/0059622 A1* | 3/2009 | Shimada et al. | 363/17 |
| 2009/0175056 A1* | 7/2009 | Choi | 363/21.06 |
| 2009/0244934 A1* | 10/2009 | Wang et al. | 363/21.06 |
| 2009/0251925 A1* | 10/2009 | Usui et al. | 363/16 |
| 2009/0256423 A1* | 10/2009 | Kyono | 307/31 |
| 2010/0046251 A1* | 2/2010 | Kyono | 363/21.02 |
| 2010/0067262 A1* | 3/2010 | Chen et al. | 363/21.06 |
| 2010/0172159 A1* | 7/2010 | Kyono | 363/21.17 |
| 2010/0277132 A1* | 11/2010 | Hara et al. | 320/163 |
| 2010/0290256 A1* | 11/2010 | Zhou et al. | 363/21.02 |
| 2011/0128758 A1* | 6/2011 | Ueno et al. | 363/17 |
| 2011/0128759 A1* | 6/2011 | Shimada et al. | 363/17 |
| 2012/0313433 A1 | 12/2012 | Uno | |
| 2013/0051102 A1* | 2/2013 | Huang et al. | 363/127 |
| 2013/0083564 A1* | 4/2013 | Bai et al. | 363/21.02 |
| 2013/0250622 A1* | 9/2013 | Hosotani et al. | 363/16 |

FOREIGN PATENT DOCUMENTS

| | | |
|---|---|---|
| JP | 7-194107 A | 7/1995 |
| JP | 11-308862 A | 11/1999 |
| JP | 2003-259644 A | 9/2003 |
| JP | 2005-094981 A | 4/2005 |
| JP | 2006-320159 A | 11/2006 |
| JP | 2007-174793 A | 7/2007 |
| JP | 2008-219978 A | 9/2008 |
| JP | 2010-98935 A | 4/2010 |
| WO | 2007/040227 A1 | 4/2007 |
| WO | 2011/114850 A1 | 9/2011 |

OTHER PUBLICATIONS

Official Communication issued in corresponding Japanese Patent Application No. 2013-526928, mailed on Sep. 24, 2014.

* cited by examiner

SWITCHING POWER SUPPLY APPARATUS INCLUDING A PLURALITY OF OUTPUTS

BACKGROUND OF THE INVENTION

1. Field of the Invention

The present invention relates to a switching power supply apparatus including a plurality of outputs, and more particularly to a switching power supply apparatus capable of controlling two outputs with high accuracy at the same time.

2. Description of the Related Art

For example, Japanese Unexamined Utility Model Registration Application Publication No. 4-121181 and Japanese Unexamined Patent Application Publication No. 6-303771 disclose switching power supply apparatuses each having a plurality of outputs.

Japanese Unexamined Utility Model Registration Application Publication No. 4-121181 discloses a power supply circuit including two secondary windings of a transformer, and a rectifying and smoothing circuit provided for each of the two secondary windings, wherein an output voltage of one of the secondary windings is detected to perform feedback control.

Japanese Unexamined Patent Application Publication No. 6-303771 discloses a switching power supply circuit of current resonance converter configuration. FIG. 1 illustrates the switching power supply circuit disclosed in Japanese Unexamined Patent Application Publication No. 6-303771. The disclosed switching power supply circuit is a switching regulator of current resonance type, which includes switching elements S1 and S2, a converter transformer 3, and a control circuit 2 for controlling the switching elements S1 and S2. The converter transformer 3 includes a primary winding Np to which an input voltage is applied in response to on- and off-operations of the switching elements S1 and S2, a secondary winding Ns2 for control voltage, which supplies an operating voltage Vcc to the control circuit 2, and a secondary winding Ns1 for output voltage, which takes out a DC (direct current) voltage Vo. A full-wave rectifier circuit is constituted on each secondary side. The control circuit 2 drives the switching elements S1 and S2 in a complementary way at duty of about 50% with interposition of a dead time during which both the switching elements are turned off, and controls the output voltage Vo with frequency control.

Any of the power supply circuits disclosed in Japanese Unexamined Utility Model Registration Application Publication No. 4-121181 and 2 is controlled such that the voltage of the rectifying and smoothing output (i.e., on the control output side) of one of the two secondary windings of the transformer is stabilized. However, the output voltage is not determined only depending on a turn ratio of the windings of the transformer because the output voltage is further affected by the presence of influences such as the coupling degree of the transformer, a resistance component, a forward drop voltage across a diode, and surges with switching operations. On the non-control output side, therefore, the output voltage varies depending on the magnitude of a load, changes and variations of element characteristics, etc. In other words, there has been a problem that accuracy in stabilization of the voltage on the non-control output side is low. In particular, it has been difficult to output the voltage with high accuracy when an output difference between two outputs is large, such as when one output is under a light load or no load.

SUMMARY OF THE INVENTION

Preferred embodiments of the present invention provide a switching power supply apparatus capable of controlling two outputs with high accuracy at the same time.

A switching power supply apparatus according to a preferred embodiment of the present invention includes a serial circuit connected to a power supply input portion to which a DC input voltage is input, and including a first switching element and a second switching element; a transformer including at least a primary winding and a secondary winding which are magnetically coupled to each other; a serial resonance circuit connected in parallel to the first switching element or the second switching element, wherein the primary winding of the transformer, an inductor, and a capacitor are connected in series; a first rectifying and smoothing circuit arranged to rectify and smooth a voltage generated in the secondary winding of the transformer during an on-period of the first switching element, and output a DC voltage to a first output voltage portion; a second rectifying and smoothing circuit arranged to rectify and smooth a voltage generated in the secondary winding of the transformer during an on-period of the second switching element, and output a DC voltage to a second output voltage portion; and a switching control circuit arranged and programmed to drive the first switching element and the second switching element to be repeatedly turned on/off in a complementary way, and arranged and programmed to control the on-time of the first switching element and the on-time of the second switching element in accordance with the first output voltage and the second output voltage, respectively, so as to control the first output voltage and the second output voltage, wherein the first rectifying and smoothing circuit includes a first rectifier switching element and smoothing capacitor, the second rectifying and smoothing circuit includes a second rectifier switching element and smoothing capacitor, and the switching control circuit includes a control circuit arranged and programmed to turn on the first rectifier switching element in response to turning-on of the first switching element, and turn off the first rectifier switching element in response to turning-off of the first switching element, and to turn on the second rectifier switching element in response to turning-on of the second switching element and turn off the second rectifier switching element in response to turning-off of the second switching element, or turn off the second rectifier switching element at a timing that a current flowing through the secondary winding to which the second rectifying and smoothing circuit is connected does not become negative. According to another preferred embodiment of the present invention, a switching power supply apparatus includes a first serial circuit connected to a power supply input portion to which a DC input voltage is input, and including a first switching element on high side and a second switching element on low side; a second serial circuit connected to the power supply input portion to which the DC input voltage is input, and including a third switching element on high side and a fourth switching element on low side; a transformer including at least a primary winding and a secondary winding which are magnetically coupled to each other; a serial resonance circuit including one end connected to a junction between the first switching element and the second switching element and the other end connected to a junction between the third switching element and the fourth switching element, the serial resonance circuit including the primary winding of the transformer, an inductor, and a capacitor; a first rectifying and smoothing circuit arranged to rectify and smooth a voltage generated in the secondary winding of the transformer during an on-period of the first switching element and the fourth switching element, and to take out a first output voltage; a second rectifying and smoothing circuit arranged to rectify and smooth a voltage generated in the secondary winding of the transformer during an on-period of the second switching element and the third switching element, and to take out a second output voltage; and a switching control circuit arranged and programmed to drive the first and fourth switching elements and the second and third switching elements to be repeatedly turned on/off in a complementary way, and arranged and programmed to control the on-time of the first and fourth switching elements and the on-time of the second and third switching elements in accordance with the first output voltage and the second output voltage, respectively, so as to control the first output voltage and the second output voltage, wherein the first rectifying and smoothing circuit includes a first rectifier switching element and smoothing capacitor, the second rectifying and smoothing circuit includes a second rectifier switching element and smoothing capacitor, and the switching control circuit includes a control circuit arranged and programmed to turn on the first rectifier switching element in response to turning-on of the first switching element, and turn off the first rectifier switching element in response to turning-off of the first switching element, and turn on the second rectifier switching element in response to turning-on of the second switching element and turning off the second rectifier switching element in response to turning-off of the second switching element, or turn off the second rectifier switching element at a timing that a current flowing through the secondary winding to which the second rectifying and smoothing circuit is connected does not become negative.

The switching power supply apparatus described above further includes a first output voltage detection circuit arranged to detect the first output voltage, and a second output voltage detection circuit arranged to detect the second output voltage, wherein, given that the first output voltage is Vo1, the second output voltage is Vo2, the on-time of the first switching element is Ton1, the on-time of the second switching element is Ton2, a first reference voltage is Vref1, and a second reference voltage is Vref2, the switching control circuit executes, based on a relationship:

[Math. 5]

$$L\left[\begin{pmatrix} T_{on1} \\ T_{on2} \end{pmatrix}\right] = \begin{pmatrix} A & B \\ C & D \end{pmatrix} L\left[\begin{pmatrix} V_{ref1} - V_{o1} \\ V_{ref2} - V_{o2} \end{pmatrix}\right] \quad (5)$$

where A, B, C and D denote transfer functions, and L[ ] denotes Laplace transform, multivariable feedback control of the on-time Ton1 of the first switching element and the on-time Ton2 of the second switching element in accordance with a detection signal of the first output voltage detection circuit and a detection signal of the second output voltage detection circuit such that the first output voltage Vo1 and the second output voltage Vo2 are held at respective predetermined voltages.

The transfer functions A and the transfer function D preferably are each set to 0. In other words, the second output voltage Vo2 is controlled with the on-time (Ton1) of the first switching element, and the first output voltage Vo1 is controlled with the on-time (Ton2) of the second switching element.

The secondary winding may include a single winding that generates the first output voltage and the second output voltage.

The secondary winding may include a first secondary winding that generates the first output voltage, and a second secondary winding that generates the second output voltage.

The first secondary winding and the second secondary winding may be wound independently of each other, and the first rectifying and smoothing circuit and the second rectifying and smoothing circuit may be connected to each other at grounded sides thereof.

The first secondary winding and the second secondary winding may be wound independently of each other, and a grounded side of the first rectifying and smoothing circuit may be connected to a voltage output side of the second rectifying and smoothing circuit, or a grounded side of the second rectifying and smoothing circuit may be connected to a voltage output side of the first rectifying and smoothing circuit.

With such a configuration, two outputs are well-balanced.

The switching control circuit preferably is a DSP (Digital Signal Processor), for example.

According to various preferred embodiments of the present invention, regardless of variations in magnitudes of loads connected to two outputs, accuracy of respective output voltages are kept high. Moreover, even when an output difference between the two outputs is large, such as when one output is under a light load or no load, accuracy of the output voltages is kept high, and a controllable load range is increased.

Furthermore, the configuration of the control circuit is simplified by controlling the second output voltage Vo2 with the on-time (Ton1) of the first switching element, and controlling the first output voltage Vo1 with the on-time (Ton2) of the second switching element.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A switching power supply apparatus according to a first preferred embodiment of the present invention will be described below with reference to FIGS. 2 to 8.

Figure 1:
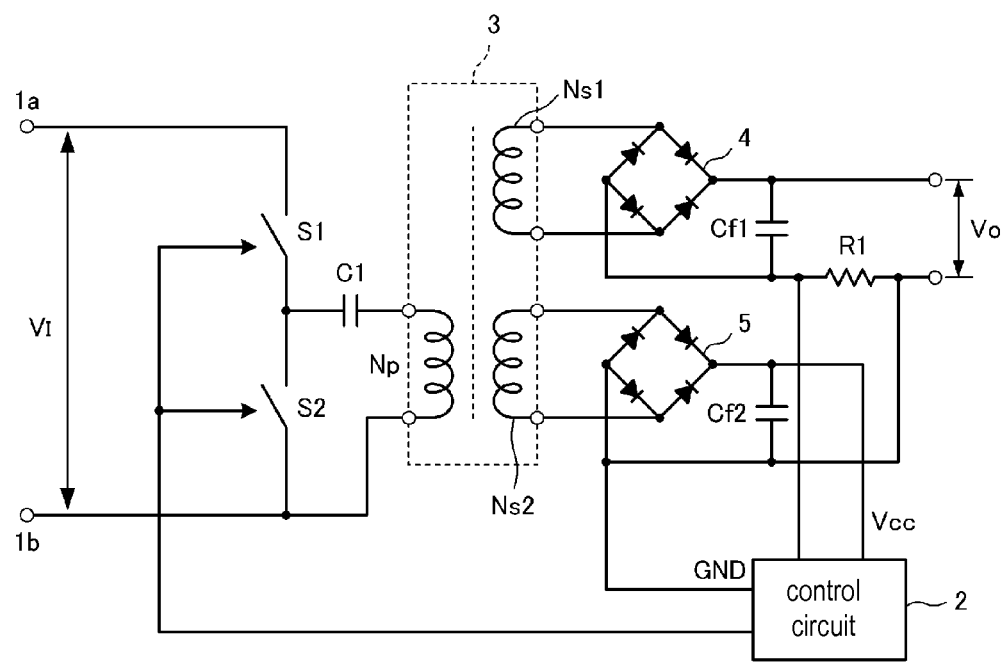
FIG. 1 is a circuit diagram of a switching power supply circuit disclosed in Japanese Unexamined Patent Application Publication No. 6-303771.
Figure 2:
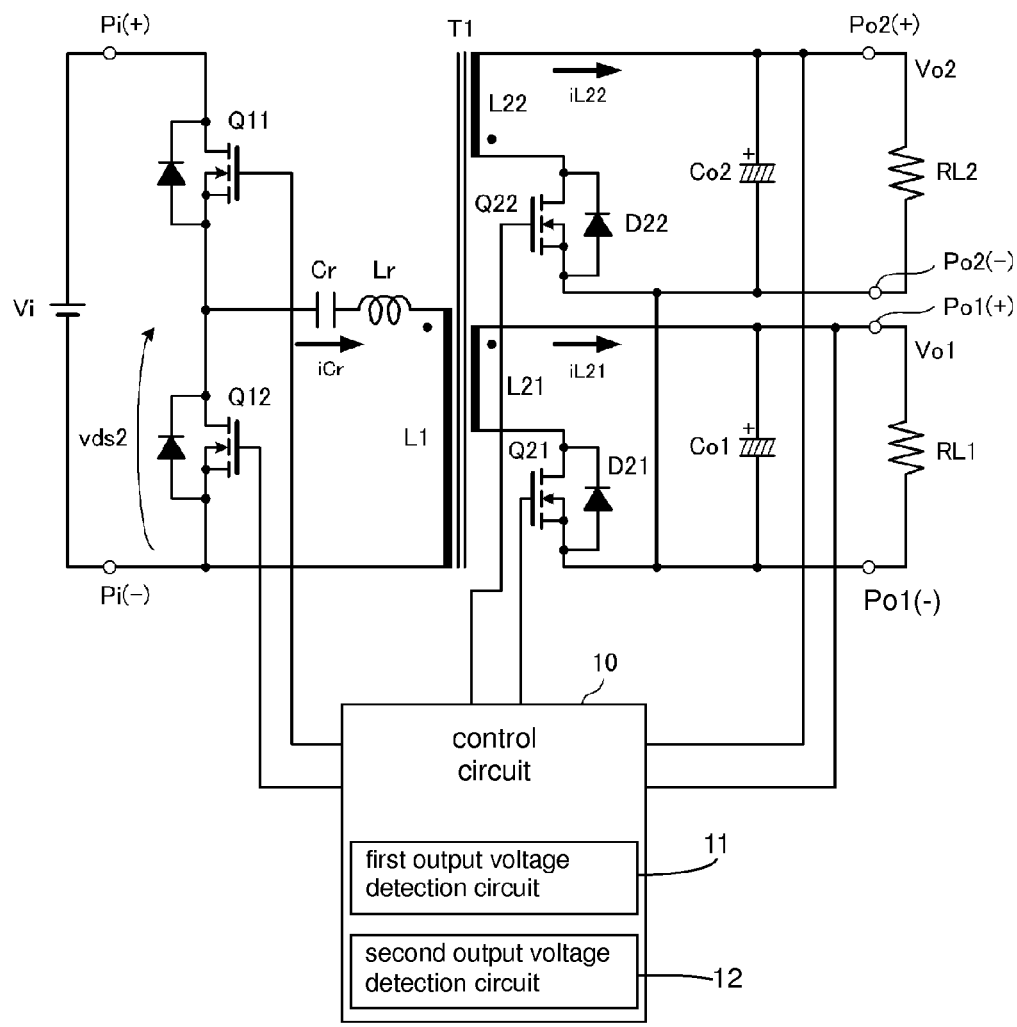
FIG. 2 is a circuit diagram of a switching power supply apparatus 101 according to a first preferred embodiment of the present invention.

FIG. 2 is a circuit diagram of a switching power supply apparatus 101 according to the first preferred embodiment. The switching power supply apparatus 101 includes a transformer T1 in which a primary winding L1 is magnetically coupled to a first secondary winding L21 and a second secondary winding L22. A first switching element Q11 and a second switching element Q12 are connected in series between power supply input terminals Pi(+) and Pi(−) both constituting a power supply input portion to which a DC input voltage Vi is input. Between the primary winding L1 of the transformer T1 and the second switching element Q12, a resonant capacitor Cr and an inductor Lr are connected in series to constitute a serial resonance circuit in cooperation with the primary winding L1. The inductor Lr may be constituted in the composite form combined with the transformer T1 instead of being provided as a discrete component.

A first rectifying and smoothing circuit constituted by a first rectifier switching element Q21 and a capacitor Co1 is associated with the first secondary winding L21 of the transformer T1. The first rectifying and smoothing circuit rectifies and smoothes a voltage generated in the first secondary winding L21 of the transformer T1 during an on-period of the first switching element Q11, and takes out a first output voltage Vo1.

Similarly, a second rectifying and smoothing circuit constituted by a second rectifier switching element Q22 and a capacitor Co2 is associated with the second secondary winding L22 of the transformer T1. The second rectifying and smoothing circuit rectifies and smoothes a voltage generated in the second secondary winding L22 of the transformer T1 during an on-period of the second switching element Q12, and takes out a second output voltage Vo2.

A diode D21 connected in parallel to the first rectifier switching element Q21 is a diode that is a discrete component or a parasitic diode (body diode) of the first rectifier switching element Q21. Similarly, a diode D22 connected in parallel to the second rectifier switching element Q22 is a diode that is a discrete component or a parasitic diode (body diode) of the second rectifier switching element Q22.

The first secondary winding L21 and the second secondary winding L22 are wound independently of each other and, in the illustrated example, they are connected to the first rectifying and smoothing circuit and the second rectifying and smoothing circuit, respectively.

The first output voltage Vo1 is output between first power-supply output terminals Po1(+) and Po1(−), and is applied to a load RL1. The second output voltage Vo2 is output between second power-supply output terminals Po2(+) and Po2(−), and is applied to a load RL2.

The first switching element Q11 and the second switching element Q12 preferably are each a MOS-FET, and a switching control circuit (hereinafter referred to simply as a "control circuit") 10 is connected to a gate of each MOS-FET. The control circuit 10 drives the first switching element Q11 and the second switching element Q12 such that they are repeatedly turned on and off in a complementary way with interposition of a state where both the switching elements are turned off. Furthermore, the control circuit 10 controls the first rectifier switching element Q21 and the second rectifier switching element Q22. Basically, the control circuit 10 turns on/off the first rectifier switching element Q21 in response to operation of the first switching element Q11, and turns on/off the second rectifier switching element Q22 in response to operation of the second switching element Q12.

Moreover, the control circuit 10 controls an on-time of the first switching element Q11 and an on-time of the second switching element Q12 in accordance with the first output voltage Vo1 and the second output voltage Vo2, respectively. In other words, an on-duty ratio changes unlike a related-art current resonant converter. As a result, the first output voltage Vo1 and the second output voltage Vo2 are stabilized to respective predetermined voltages.

Figure 3A:
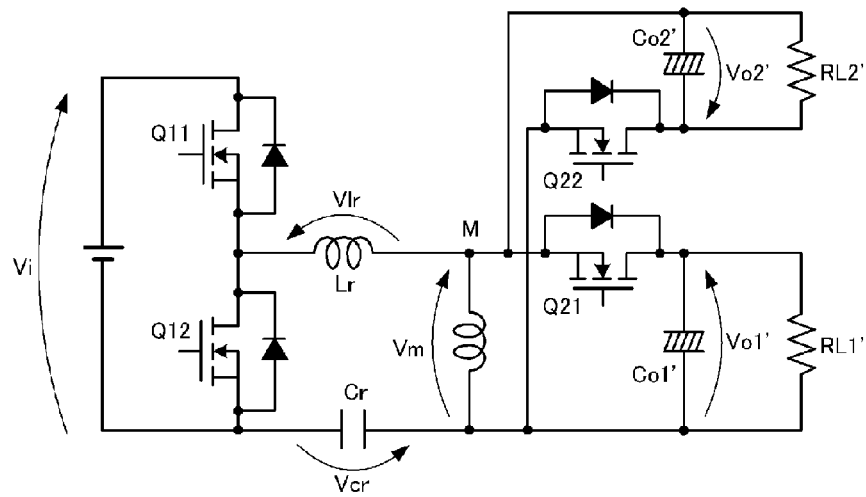
FIG. 3A is an equivalent circuit diagram of the entire switching power supply apparatus 101 illustrated in FIG. 2.
Figure 3B:
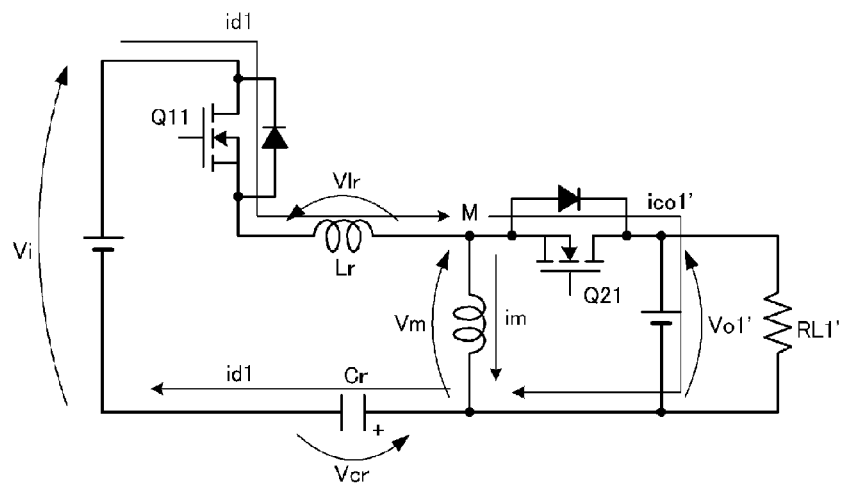
FIG. 3B is an equivalent circuit diagram when a first switching element Q11 is in an on-state.

FIG. 3A is an equivalent circuit diagram of the entire switching power supply apparatus 101 illustrated in FIG. 2. FIG. 3B is an equivalent circuit diagram when the first switching element Q11 is in an on-state, and FIG. 3C is an equivalent circuit diagram when the second switching element Q12 is in an on-state.

Figure 3C:
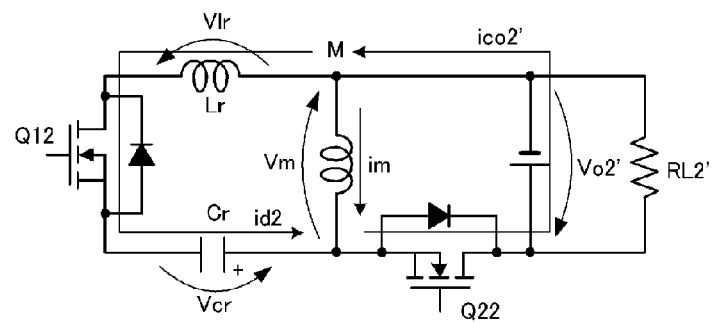
FIG. 3C is an equivalent circuit diagram when a second switching element Q12 is in an on-state.

In FIGS. 3A, 3B and 3C, an inductor M is an inductor equivalently representing a mutual inductance attributable to the primary winding L1 and the secondary windings L21 and L22 of the transformer T1. Capacitors Co1' and Co2' correspond to the capacitors Co1 and Co2 illustrated in FIG. 2, respectively. Loads RL1' and RL2' correspond to the loads RL1 and RL2 illustrated in FIG. 2, respectively. Moreover, currents ico1' and ico2' correspond to the currents flowing through the capacitors Co1 and Co2 illustrated in FIG. 2, respectively. Respective values of the capacitors Co1' and Co2', the loads RL1' and RL2', and the currents ico1' and ico2' depend on the turns ratio between the primary winding and the secondary winding of the transformer T1 as expressed by the following formulae.

[Math. 1]

$$C_{o1}' = n_1^2 C_{o1}$$

$$R_{L1}' = n_1^2 R_{L1}$$

$$i_{co1}' = i_{co1}/n_1^2 \qquad (1)$$

[Math. 2]

$$C_{o2}' = n_2^2 C_{o2}$$

$$R_{L2}' = n_2^2 R_{L2}$$

$$i_{co2}' = i_{co2}/n_2^2 \qquad (1)$$

In the above formulae, Co1' and Co2' are capacitance values of the capacitors Co1' and Co2', RL1' and RL2' are resistance values of the loads RL1' and RL2', and ico1' and ico2' are current values of the currents ico1' and ico2'.

Here, assuming that the turn number of the primary winding L1 of the transformer T1 is N1, the turn number of the first secondary winding L21 thereof is N21, and the turn number of the second secondary winding L22 thereof is N22, n1 and n2 are expressed as follows:

$$n1 = N1/N21$$

$$n2 = N1/N22$$

With turning-on of the first switching element Q11, the input voltage Vi is applied to the resonance circuit, whereby the current flows so as to charge Cr as illustrated in FIG. 3B. Furthermore, with turning-on of the second switching element Q12, the current flows, as illustrated in FIG. 3C, such that electric charges accumulated in Cr are discharged.

Assuming here that the voltage across the inductor Lr is Vlr, the voltage applied to the load RL1' is Vo1', the voltage across the capacitor Cr is Vcr, the current flowing through the first rectifier switching element Q21 is id1, the voltage across the inductor M is Vm, and the current flowing through the inductor M is im, the following formulae are held during a period in which the first switching element Q11 is turned on and the first rectifier switching element Q21 is turned on.

[Math. 3]

$$V_i = v_{lr} + v_m + v_{cr} \qquad (3)$$

$$v_{lr} = L_r \frac{di_{d1}}{dt}$$

$$v_{cr} = \frac{1}{C_r} \int i_{d1} dt$$

$$v_m = M \frac{di_m}{dt} = V_{o1}'$$

$$i_{co1}' = i_{d1} - i_m$$

Similarly, the following formulae are held during a period in which the second switching element Q12 is turned on and the second rectifier switching element Q22 is turned on.

[Math. 4]

$$0 = v_{lr} - V_{o2}' + v_{cr} \qquad (4)$$

$$v_{lr} = -L_r \frac{di_{d1}}{dt}$$

$$v_{cr} = -\frac{1}{C_r} \int i_{d1} dt$$

$$v_m = M \frac{di_m}{dt} = -V_{o2}'$$

$$i_{co2}' = i_{d2} + i_m$$

Thus, during the on-period of the first switching element Q11, electric power is supplied to the load RL1', and electric power to be supplied to the load RL2' is charged in the capacitor Cr. During the on-period of the second switching element Q12, energy accumulated in the capacitor Cr is supplied to the load RL2'. In addition, because the capacitor Cr is discharged, larger electric power is supplied to the resonance circuit from the input power supply during the on-period of the first switching element Q11. By performing feedback control during the on-period of the first switching element Q11 and during the on-period of the second switching element Q12 as described above, it is possible to control a current resonance state and further control Vo1' (=Vo1) and Vo2' (=Vo2) independently of each other.

The above-described control system is a multivariable feedback control system in which two control variables and two manipulated variables mutually interfere with each other, and control is performed with a controller expressed by the following transfer function matrix.

[Math. 5]

$$L\left[\begin{pmatrix} T_{on1} \\ T_{on2} \end{pmatrix}\right] = \begin{pmatrix} A & B \\ C & D \end{pmatrix} L\left[\begin{pmatrix} V_{ref1} - V_{o1} \\ V_{ref2} - V_{o2} \end{pmatrix}\right] \qquad (5)$$

Here, L[ ] denotes the Laplace transform, Ton1 denotes the on-time of the first switching element Q11, and Ton2 denotes the on-time of the second switching element Q12. Furthermore, A, B, C and D are coefficients determined depending on the circuit and the operating state. Vref1 and Vref2 are reference voltages.

When executing PI control of Ton1 and Ton2 based on Vo2 and Vo1, respectively, the coefficients A, B, C and D in the formula (5) are given as follows.

[Math. 6]

$$A = 0 \qquad (6)$$

$$B = \frac{K_{IB}}{s} + K_{PB}$$

$$C = \frac{K_{IC}}{s} + K_{PC}$$

$$D = 0$$

Here, $K_{IB}/s$ and $K_{IC}/s$ represent integrals, and $K_{PB}$ and $K_{PC}$ represent proportions.

In this example, the control is simplified because of A=D=0. In other words, if the coefficient A and D are also not zero, the control is difficult to realize in practice because of multivariable control. However, if A=D=0 is held, the control is comparatively easy to realize.

As for the case of constituting the control circuit 10 by a DSP (Digital Signal Processor) to determine how to generate drive pulses for the first switching element Q11 and the second switching element Q12 with the given Ton1 and Ton2, setting and operation of a digital PWM module inside the DSP will be described below with reference to FIG. 4.

Figure 4:
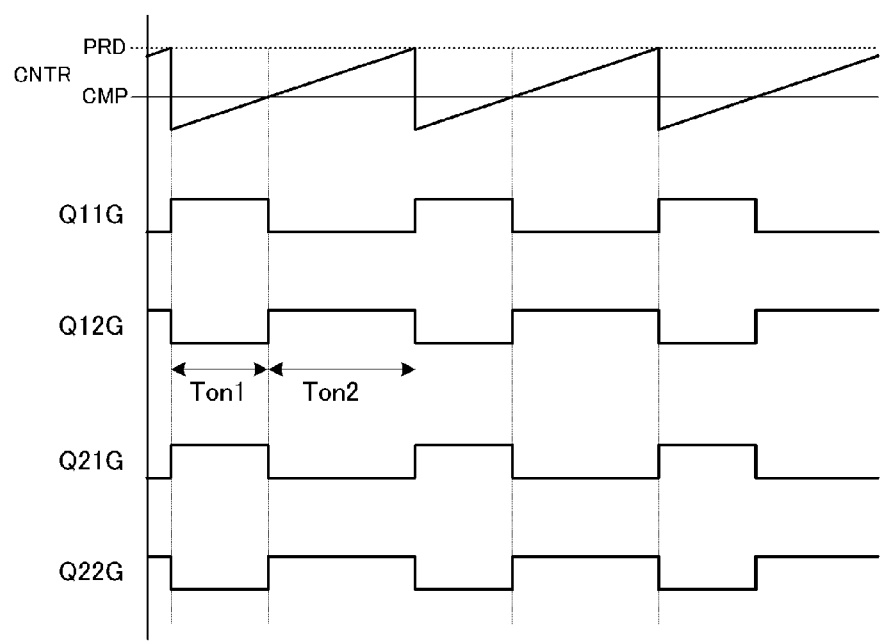
FIG. 4 illustrates a manner of generating drive pulses for the first switching element Q11, the second switching element Q12, a first rectifier switching element Q21, and a second rectifier switching element Q22.

In FIG. 4, CNTR denotes a counter that increments a count per clock. PRD denotes a "period (full stop)". The CNTR is reset to zero upon reaching a value of the PRD. A switching period is thus determined. CMP denotes "compare", and a pulse is reversed upon the CNTR and the CMP matching with each other.

Q11G denotes a gate drive pulse for Q11, and Q21G denotes a gate drive pulse for Q21. Q11G and Q21G are set so as to rise upon the CNTR matching with 0 and to fall upon the CNTR and the CMP matching with each other. Q12G denotes a gate drive pulse for Q12, and Q22G denotes a gate drive pulse for Q22. Q12G and Q22G are set so as to rise upon the CNTR matching with the CMP and to fall upon the CNTR matching with the PRD. The drive pulses for Q11 and Q12 are generated such that the PRD corresponds to Ton1+Ton2, and the CMP corresponds to Ton1.

The control circuit 10 illustrated in FIG. 2 includes a first output voltage detection circuit 11 arranged to detect the first output voltage Vo1, and a second output voltage detection circuit 12 arranged to detect the second output voltage Vo1. The control circuit 10 illustrated in FIG. 2 executes feedback control of the on-time Ton1 of the first switching element Q11 and the on-time Tong of the second switching element Q12 in accordance with a detection signal of the first output voltage detection circuit 11 and a detection signal of the second output voltage detection circuit 12, respectively, such that the first output voltage Vo1 and the second output voltage Vo1 are held at respective predetermined values. In other words, the PRD and the CMP are controlled in such a way inside the DSP.

As described above, the capacitor Cr is charged during the on-period of the first switching element Q11, and the energy accumulated in the capacitor Cr is supplied to the load during the on-period of the second switching element Q12. Through that action, the second output voltage Vo2 is controlled with the on-time of the first switching element Q11. Similarly, the first output voltage Vo1 is controlled with the on-time of the second switching element Q12.

Figure 5:
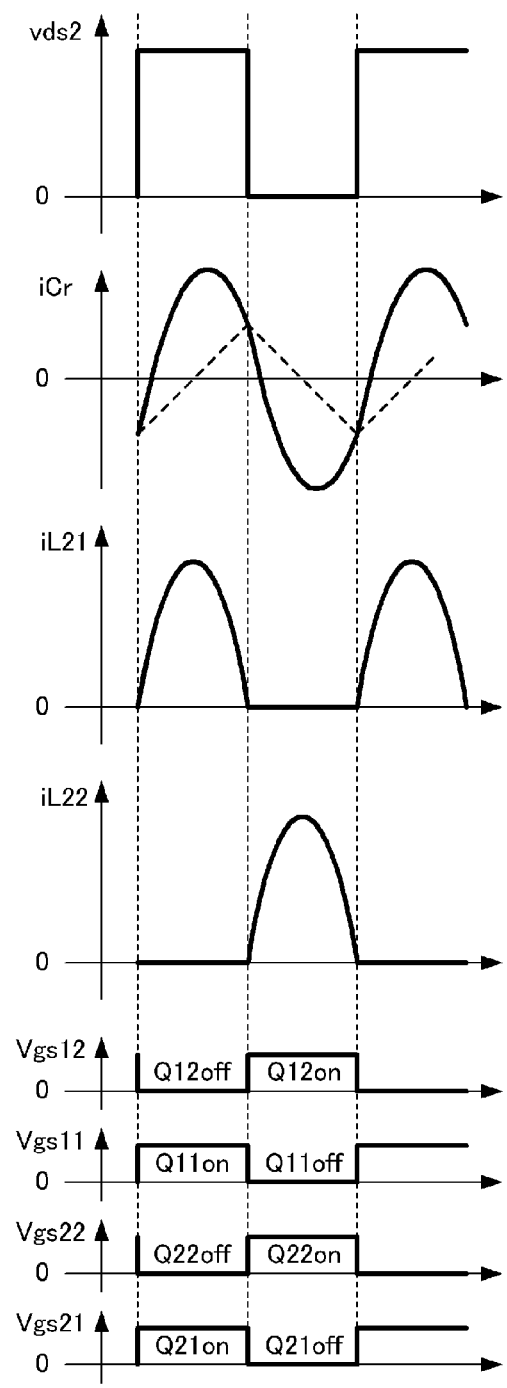
FIG. 5 illustrates waveforms of voltages and currents in various portions in FIG. 2 when an operating frequency fsw is substantially equal to a resonance frequency f0 and a current flowing through a first load RL1 is equal to a current flowing through a second load RL2.
Figure 6:
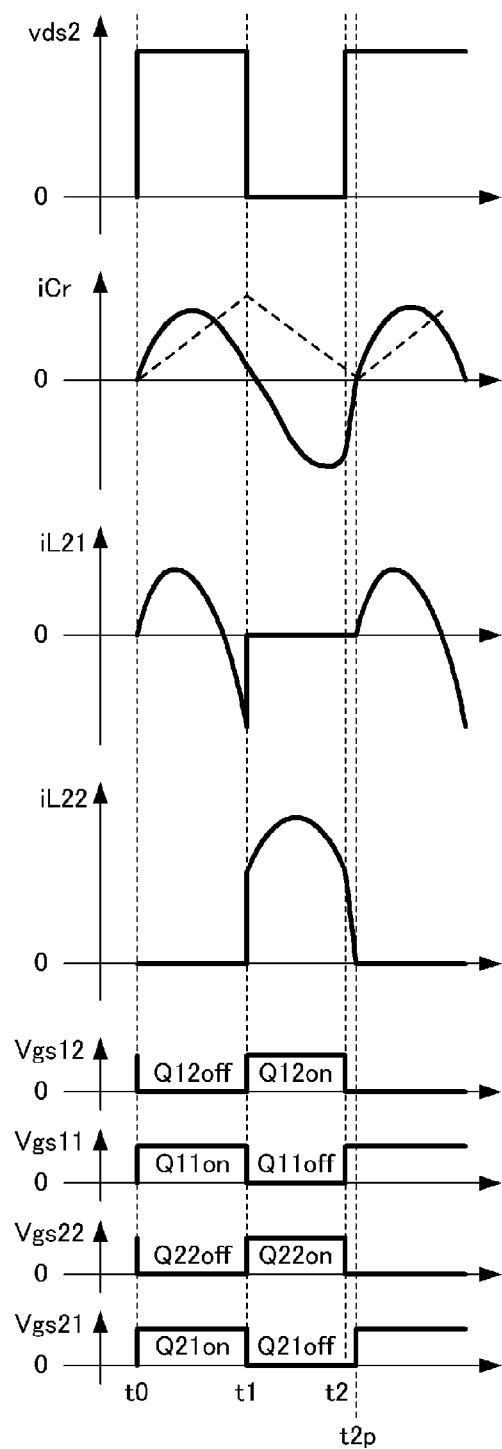
FIG. 6 illustrates waveforms of voltages and currents in the various portions in FIG. 2 when the operating frequency fsw of the switching power supply circuit is higher than the resonance frequency f0 and the current flowing through the first load RL1 is smaller than the current flowing through the second load RL2.
Figure 7:
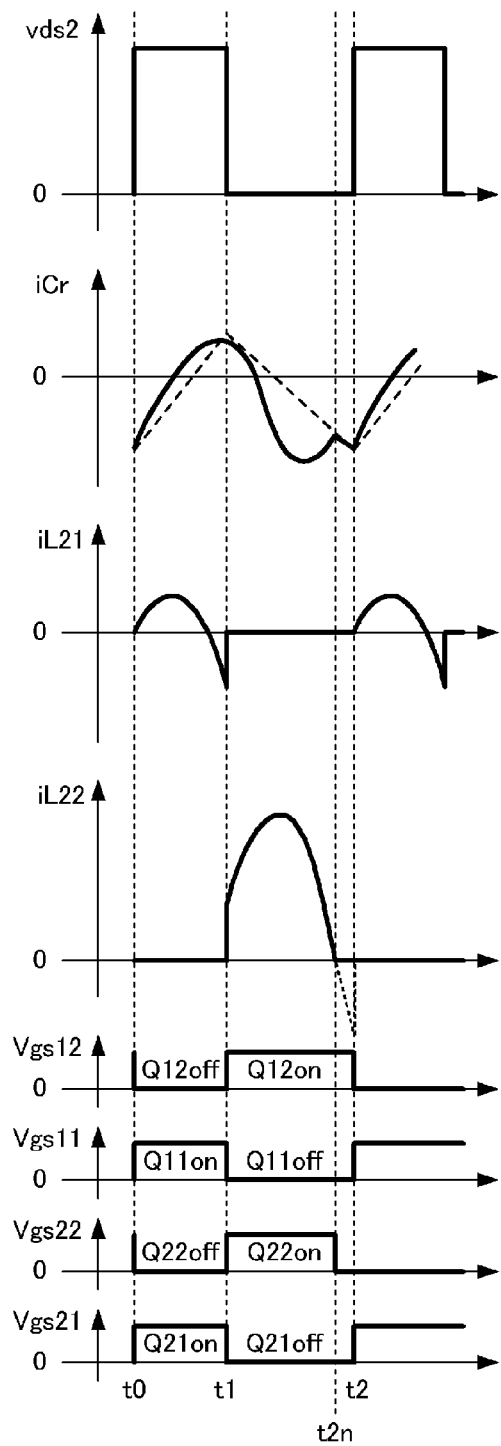
FIG. 7 illustrates waveforms of voltages and currents in the various portions in FIG. 2 when the operating frequency fsw is lower than the resonance frequency f0 and the current flowing through the first load RL1 is smaller than the current flowing through the second load RL2.
Figure 8:
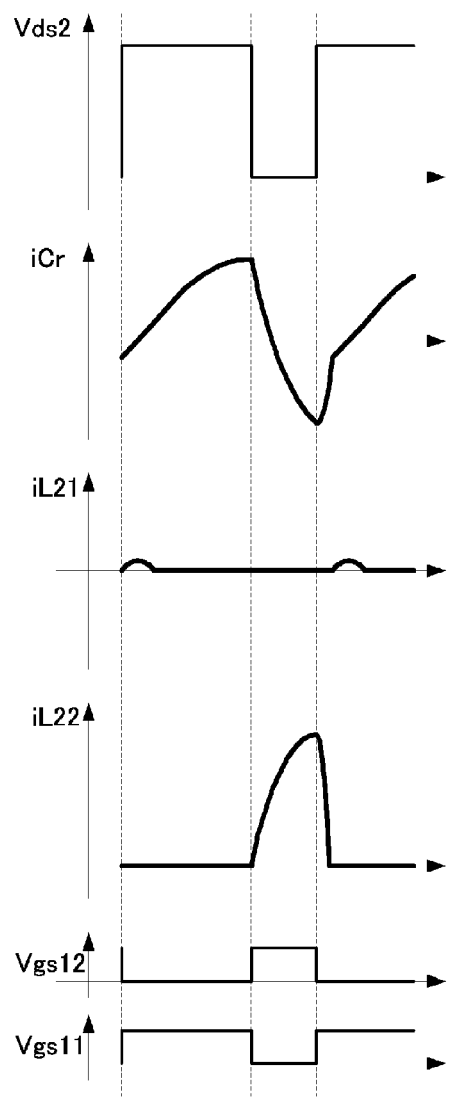
FIG. 8 illustrates waveforms when the rectifier switching elements on the secondary side in the switching power supply apparatus, illustrated in FIG. 2, are constituted by diodes.

FIGS. 5 to 7 illustrate waveforms of voltages and currents in various portions of the switching power supply apparatus illustrated in FIG. 2. FIG. 8 represents a comparative example and illustrates waveforms when the rectifier switching elements on the secondary side in the switching power supply apparatus, illustrated in FIG. 2, are constituted by diodes. In those drawings, reference symbols are defined as follows.

Vds2: drain-source voltage of the second switching element Q12
  iCr: current flowing through the resonance capacitor Cr
  iL21: current flowing through the secondary winding L21
  iL22: current flowing through the secondary winding L22
  Vgs12: gate-source voltage of the second switching element Q12
  Vgs11: gate-source voltage of the first switching element Q11
  Vgs22: gate-source voltage of the second rectifier switching element Q22
  Vgs21: gate-source voltage of the first rectifier switching element Q21
  Dotted line of triangular wave: excitation current for the primary winding L1 of the transformer T1

It is to be noted that the illustrated waveforms represent examples under the following conditions. Furthermore, the waveforms vary depending on the constants of the elements and the input/output conditions.

Although an appropriate dead time period is usually set before turning-on of each of the first switching element Q11 and the second switching element Q12, the dead time period is omitted in FIGS. 5 to 8 except for the case where it is explained.

Although voltage resonance occurs at the turning-on and -off of the first switching element Q11 and the second switching element Q12, it is omitted in FIGS. 5 to 8.

With the first switching element Q11 and the second switching element Q12 switched over alternately, a rectangular pulse Vds2 is applied to the resonance circuit. Accordingly, a sine-wave current is caused to flow and is rectified by each rectifier circuit. In the rectifier circuit, a loss is reduced by turning on the switching element during a period in which the current flows.

FIG. 5 illustrates the waveforms when a current flowing through the first load RL1 is equal to a current flowing through the second load RL2, and FIGS. 6 to 8 illustrates the waveforms when the current flowing through the first load RL1 is smaller than the current flowing through the second load RL2. FIG. 5 represents an exemplary case where an operating frequency fsw is substantially equal to a resonance frequency f0 that is determined depending on the inductor Lr and the capacitor Cr, FIG. 6 illustrates an exemplary case where the operating frequency fsw of the switching power supply circuit is higher than the resonance frequency f0, and FIG. 7 represents an exemplary case where the operating frequency fsw is lower than the resonance frequency f0.

When equal electric power is supplied to the first load RL1 and the second load RL2, a negative current does not flow as denoted by iL21 in FIG. 5. In other words, there is no period during which regeneration occurs.

When the first load RL1 is in a no-load state or a light-load state close to a no-load state, as illustrated in FIGS. 6 and 7, the current due to the resonance flows through the secondary windings L21 and L22, and a forward current is supplied at the start of conduction of the rectifier circuit. On the other hand, transfer of electric power to one output with one switching element serves as charge or discharge to transfer electric power to the other output. Therefore, an on-period of the switching for the light load cannot be shortened. Thus, the electric power supplied to the load is suppressed in total by continuously holding the switching element of the rectifier circuit in the on-state even after the current on the secondary side has reduced to be negative with the resonance, and by causing the current to be regenerated from the output. As a result, the output voltage is stably maintained even in the case of the light load.

FIG. 6 represents an example in which the states of the switching elements Q11 and Q12 are reversed before the current (iL22) on the non-regeneration side becomes 0. Even with switching of the direction of the current flowing in the primary side of the transformer T1 at a timing t2, since the direction of the current iL22 flowing through the second rectifying and smoothing circuit is still forward, the current iL22 continues to flow through the parasitic diode D22 of the second rectifier switching element Q22 if the first rectifier switching element Q21 is turned off. Unless the rectifier switching element is switched over during such a period, the current iL22 continues to flow until reaching zero, and the current iL21 starts to flow through the first rectifying and smoothing circuit after a timing t2p.

The turning-on timing of the second rectifier switching element Q22 may be determined in synchronism with the reversal of the first switching element Q11. The turning-on timing of the first switching element Q11 may also be determined in synchronism with the turning-on timing of the first rectifier switching element Q21. Stated in another way, when the positive current is flowing, the current is allowed to continuously flow through the diode (body diode of FET) D22, which is connected in parallel, even by turning off the switching element. In trying to further suppress the loss, however, it is preferable to continuously hold the switching element in the on-state during the period in which the positive current flows, by setting a proper dead time for the turning-on timing t2p of the first rectifier switching element Q21, or by detecting that the current iL22 has become zero. Such a configuration ensures ZCS (Zero Current Switching) operation, and reduces the switching loss.

FIG. 7 represents an example in which the current iL22 on the non-regeneration side becomes 0 before the states of the switching elements Q11 and Q12 are reversed. In the example illustrated in FIG. 7, by turning off the second rectifier switching element Q22 at a timing t2n, the current is caused to become zero at the timing t2n, such that the current iL22 in the negative direction (i.e., the current denoted by a dotted line) does not flow. Stated in another way, the turning-off timing t2n of the second rectifier switching element Q22 may be determined by detecting that the current iL22 has become zero.

If the second rectifier switching element Q22 is turned off in synchronism with the second switching element Q12, the current iL22 flow as a negative current during a period from t2n to t2 as denoted by a dotted line in FIG. 7. When the load is not a light load, the occurrence of regeneration brings about wastes in terms of loss and power transfer. It is hence preferable to turn off the switching element in the rectifier circuit under the situation where useless regeneration occurs.

Under the situation where a rate of the above-mentioned negative current is relatively small, the second rectifier switching element Q22 may be turned off in synchronism with the second switching element Q12 while a proper dead time is set. This makes the configuration of the control circuit simpler. On that occasion, the second rectifier switching element Q22 may be turned off a little earlier than the timing t2n. Even in such a case, the current flows through the parasitic diode D22 until the timing t2n.

FIG. 5 represents the exemplary case where the operating frequency fsw is substantially equal to the resonance frequency f0. If the operating frequency fsw is lower than the resonance frequency f0, the regenerating operation occurs even in the state where two output loads are balanced. However, the occurrence of the regenerating operation under an ordinary load (i.e., in a state not under a light load) produces a loss due to useless regeneration. Accordingly, when the load current is not less than a predetermined value, the switching element is desirably controlled such that a negative current will not flow.

FIG. 8 illustrates waveforms when the rectifier switching elements on the secondary side in the switching power supply apparatus, illustrated in FIG. 2, are constituted by diodes. The on-period of Vgs12 needs to be reduced to suppress the electric power supplied to the RL1. On the other hand, the electric power is supplied to the RL2 during the on-period of Vgs12. During the on-period of Vgs11, the capacitor Cr that supplies the electric power to the RL2 is charged. However, because iL21 is substantially zero during most of the on-period of Vgs11, a longer time is required to charge the capacitor Cr. As a result, iL22 takes a pulse-shaped waveform, thus increasing a loss. Moreover, when the two outputs are not balanced and the RL1 is a light load, particularly, when the RL1 is no load, the circuit can no longer be operated.

Second Preferred Embodiment

Figure 9A:
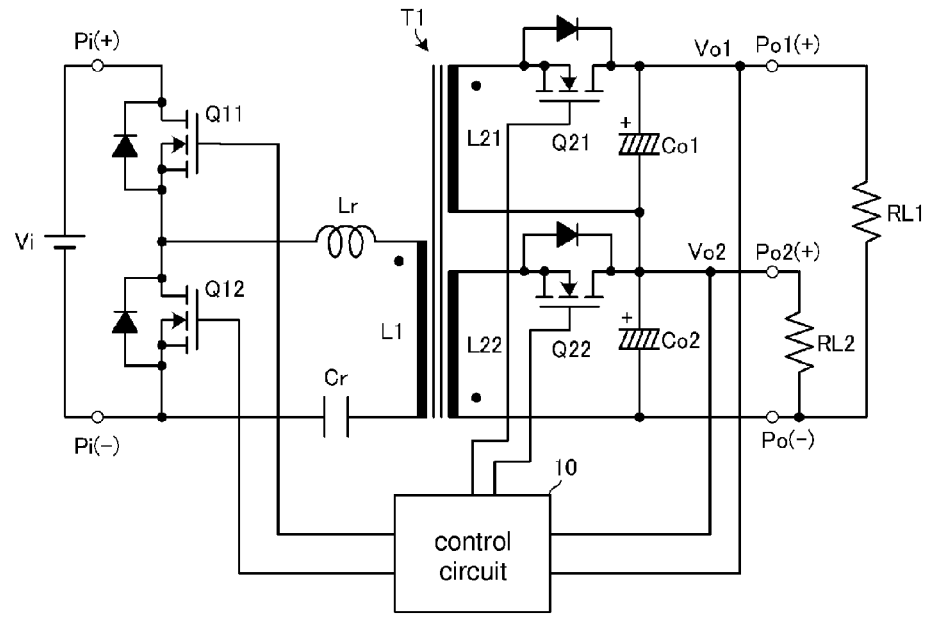
FIGS. 9A and 9B are circuit diagrams of switching power supply apparatuses 103A and 103B according to a second preferred embodiment of the present invention.
Figure 9B:
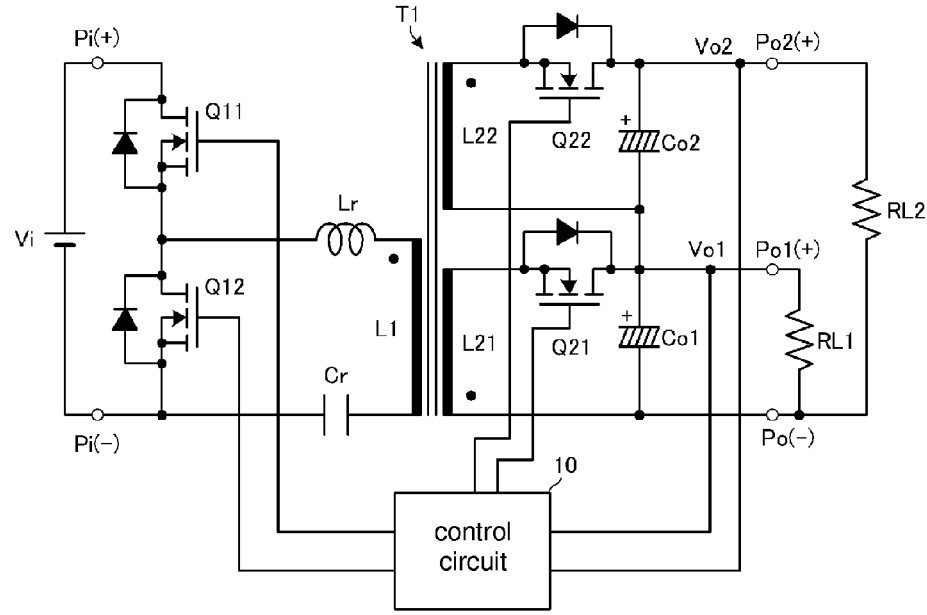

FIGS. 9A and 9B are circuit diagrams of switching power supply apparatuses 103A and 103B according to a second preferred embodiment of the present invention. The circuit diagram of the second preferred embodiment differs from that of the first preferred embodiment, illustrated in FIG. 2, in the configuration on the secondary side of the transformer T1. The operation of the converter is the same as that in the switching power supply apparatus 101 illustrated in FIG. 2.

In examples of FIG. 9A, the first secondary winding L21 and the second secondary winding L22 are wound independently of each other, and the grounded side of the first rectifying and smoothing circuit is connected to the voltage output side of the second rectifying and smoothing circuit With such a configuration, sharing between the first secondary winding L21 and the second secondary winding L22 is adjusted in supplying electric power. For example, in the case of needing the outputs of Vo1=12 [V], 100 [W] (8.3 A) and Vo2=5 [V], 30 [W] (6 A), the first secondary winding L21 is required to output 7 [V] and 58.1 [W] (7×8.3=58.1), and the second secondary winding L22 is required to output 5 [V] and 71.5 [W] (5×(8.3+6)=71.5).

When trying to obtain the same specifications with the switching power supply apparatus 101 of the first preferred embodiment, unbalanced sharing in supplying electric power, i.e., the first secondary winding L21 providing 12 [V] and 100 [W] (8.3 A) and the second secondary winding L22 providing 5 [V] and [W] (6 A), results. According to the second preferred embodiment, the electric power is evenly distributed, and useless regeneration is prevented or significantly reduced. As a result, efficiency increases.

In the switching power supply apparatus 103B of FIG. 9B, the grounded side of the second rectifying and smoothing circuit is connected to the voltage output side of the first rectifying and smoothing circuit. Such a configuration can be regarded as one obtained by reversing the polarity of the secondary winding of the transformer T1 with respect to the primary winding thereof from that in the case of FIG. 9A. The operating effect of the switching power supply apparatus 103B is similar to that of the switching power supply apparatus 103A.

In FIG. 9A, Vo1 output to the load RL1 is provided as both the outputs of the secondary windings L21 and L22 of the transformer T1. Accordingly, when the first load RL1 side is under a light load, regeneration occurs through the first secondary winding L21. However, because the second secondary winding L22 shares the output on the first load RL1 side as well, the regenerating operation is less apt to occur even when the second load RL2 side is under a light load. The above-mentioned point is similarly applied to the case of FIG. 9B.

Third Preferred Embodiment

While each of the above-described preferred embodiments preferably includes a transformer including two secondary windings, a third preferred embodiment includes one secondary winding to provide two output voltages. FIGS. 10 to 13 are circuit diagrams on the secondary side of four switching power supply circuits according to the third preferred embodiment. The configuration on the primary side may be any of the circuits described in the foregoing preferred embodiments.

Figure 10:
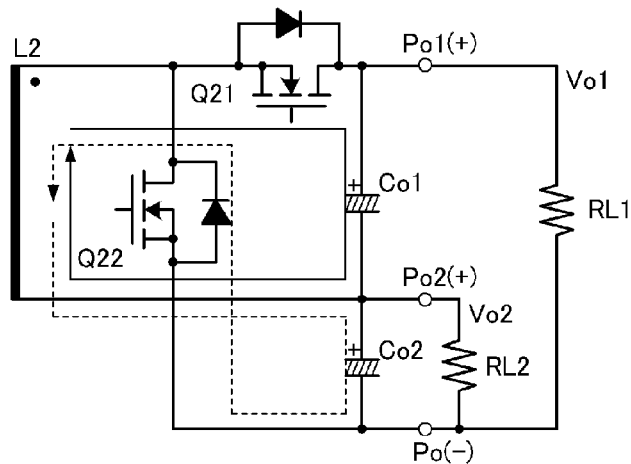
FIG. 10 is a circuit diagram on the secondary side of a switching power supply circuit according to a third preferred embodiment of the present invention.

In an example of FIG. 10, a voltage doubler rectifier circuit including the rectifier switching elements Q21 and Q22 and the capacitors Co1 and Co2 is associated with a secondary winding L2 of the transformer. During a period in which a positive voltage is generated in the secondary winding L2 on the side denoted by a dot mark, the capacitor Co1 is charged through a path denoted by a solid-line arrow in FIG. 10. During a period in which a negative voltage is generated in the secondary winding L2 on the side denoted by the dot mark, the capacitor Co2 is charged through a path denoted by a dotted-line arrow in FIG. 10. An added value of both charging voltages of the capacitors Co1 and Co2 is output to the first power-supply output terminal Po1(+). The charging voltage of the capacitor Co2 is output to the second power-supply output terminal Po2(+).

Figure 11:
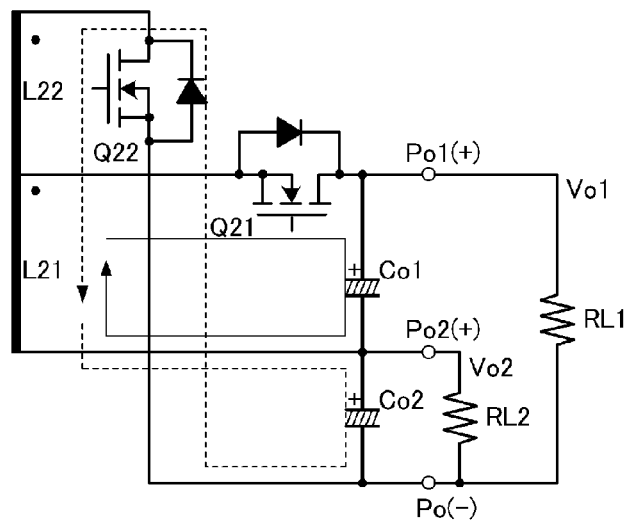
FIG. 11 is a circuit diagram on the secondary side of another switching power supply circuit according to the third preferred embodiment of the present invention.

In an example of FIG. 11, the voltage doubler rectifier circuit including the rectifier switching elements Q21 and Q22 and the capacitors Co1 and Co2 is associated with secondary windings L21 and L22 of the transformer. Unlike the example of FIG. 10, the secondary winding L22 is added, and the rectifier switching element Q22 is connected to the added secondary winding. Therefore, the charging voltage of the capacitor Co2 is increased in comparison with the charging voltage of the capacitor Co1. With such an arrangement, a ratio of the first output voltage Vo1 to the second output voltage Vo2 is greatly shifted from 2:1. While the voltage is increased by adding the winding in the example of FIG. 11, a tap may be withdrawn out from the secondary winding to obtain a lower voltage.

Figure 12:
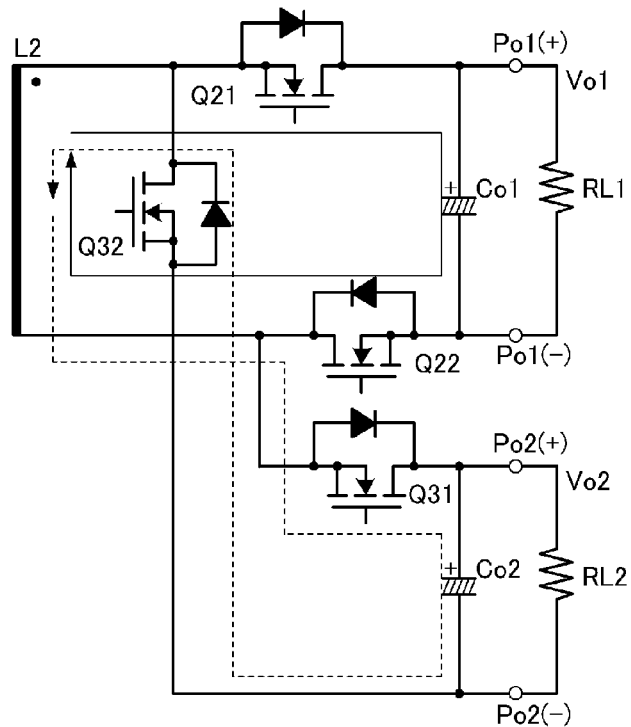
FIG. 12 is a circuit diagram on the secondary side of still another switching power supply circuit according to the third preferred embodiment of the present invention.

In an example of FIG. 12, a rectifying and smoothing circuit constituted by the rectifier switching elements Q21 and Q22 and the capacitor Co1 and a rectifying and smoothing circuit constituted by rectifier switching elements Q31 and Q32 and the capacitor Co2 are connected to the secondary winding L2. During a period in which a positive voltage is generated in the secondary winding L2 on the side denoted by a dot mark, the capacitor Co1 is charged through a path denoted by a solid-line arrow in FIG. 12. During a period in which a negative voltage is generated in the secondary winding L2 on the side denoted by the dot mark, the capacitor Co2 is charged through a path denoted by a dotted-line arrow in FIG. 12.

Figure 13:
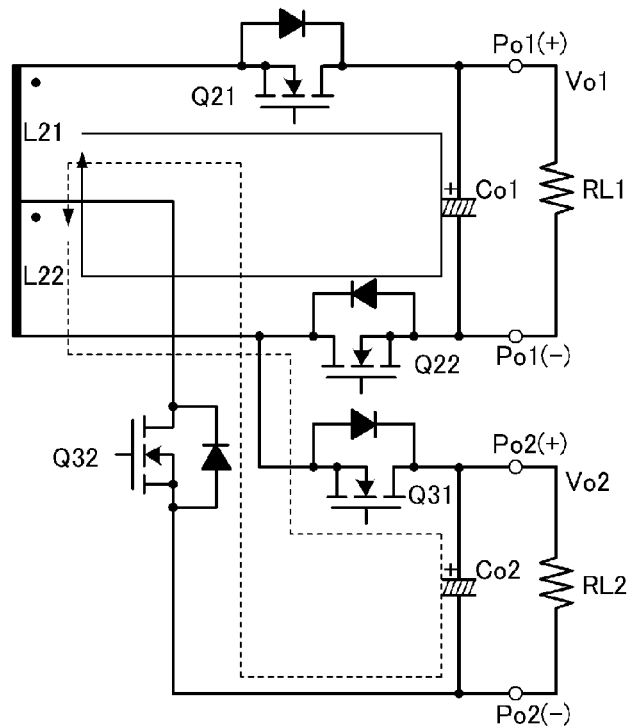
FIG. 13 is a circuit diagram on the secondary side of still another switching power supply circuit according to the third preferred embodiment of the present invention.

In an example of FIG. 13, the rectifying and smoothing circuit constituted by the rectifier switching elements Q21 and Q22 and the capacitor Co1 and the rectifying and smoothing circuit constituted by the rectifier switching elements Q31 and Q32 and the capacitor Co2 are connected to two secondary windings L21 and L22. Unlike the example of FIG. 12, however, a tap is withdrawn out from the secondary winding, and the rectifier switching element Q32 is connected to the withdrawn winding tap. Therefore, the charging voltage of the capacitor Co2 is reduced in comparison with the charging voltage of the capacitor Co1. With such an arrangement, a ratio of the first output voltage Vo1 to the second output voltage Vo2 is greatly shifted from 1:1. While, in the above-described example, the tap is withdrawn out from the secondary winding to obtain a lower voltage, the voltage may be increased by adding a winding.

In the example of FIG. 11, Vo1 output to the load RL1 is provided as both the outputs of the secondary windings L21 and L22 of the transformer. Accordingly, when the first load RL1 side is under a light load, regeneration can occur through the first secondary winding L21. However, because the second secondary winding L22 shares the output on the first load RL1 side as well, the regenerating operation is not performed even when the second load RL2 side is under a light load. The above-mentioned point is similarly applied to the case of FIG. 13.

Fourth Preferred Embodiment

Figure 14:
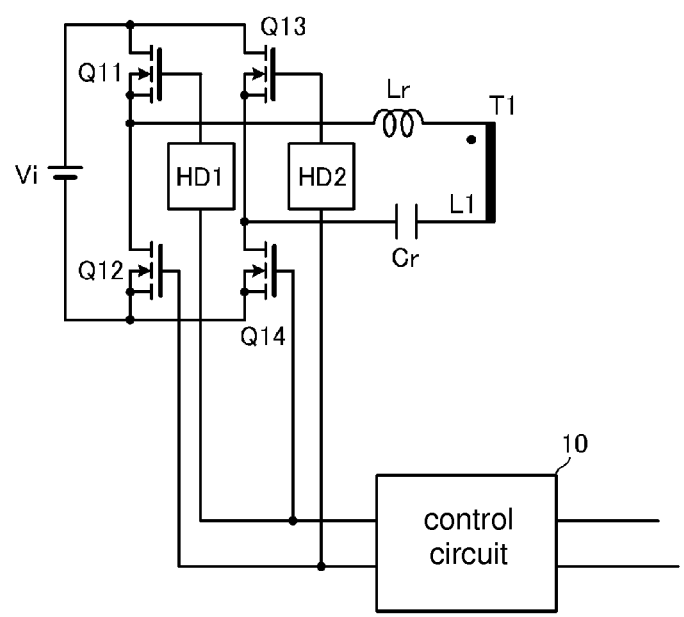
FIG. 14 is a circuit diagram of the primary side of a switching power supply circuit according to a fourth preferred embodiment of the present invention.

While each of the above-described preferred embodiments preferably includes two switching elements on the primary side of the transformer, a fourth preferred embodiment of the present invention preferably includes four switching elements. FIG. 14 is a circuit diagram of the primary side of a switching power supply apparatus according to the fourth preferred embodiment. The configuration on the secondary side may be any of the circuits described in the foregoing preferred embodiments.

A first serial circuit including a first switching element Q11 on the high side and a second switching element Q12 on the low side, and a second serial circuit including a third switching element Q13 on the high side and a fourth switching element Q14 on the low side are each connected to the power supply input portion.

High-side driver circuits HD1 and HD2 are connected respectively to the switching elements Q11 and Q13 on the high side. The control circuit 10 controls the switching elements Q11 and Q14 to be turned on/off at the same time, and controls the switching elements Q12 and Q13 to be turned off/on at the same time.

In such a manner, a bridge circuit is constituted on the primary side.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
   a serial circuit connected to a power supply input portion to which a DC input voltage is input, and including a first switching element and a second switching element;
   a transformer including at least a primary winding and a secondary winding which are magnetically coupled to each other;
   a serial resonance circuit connected in parallel to the first switching element or the second switching element and including the primary winding of the transformer, an inductor, and a capacitor connected in series;
   a first rectifying and smoothing circuit arranged to rectify and smooth a voltage generated in the secondary winding of the transformer during an on-period of the first switching element, and output a DC voltage to a first output voltage portion;
   a second rectifying and smoothing circuit arranged to rectify and smooth a voltage generated in the secondary winding of the transformer during an on-period of the second switching element, and output a DC voltage to a second output voltage portion; and
   a switching control circuit arranged and programmed to drive the first switching element and the second switching element to be repeatedly turned on/off in a complementary way, and arranged and programmed to control the on-time of the first switching element and the on-time of the second switching element in accordance with the first output voltage and the second output voltage, respectively, so as to control the first output voltage and the second output voltage; wherein
   the first rectifying and smoothing circuit includes a first rectifier switching element and a smoothing capacitor;
   the second rectifying and smoothing circuit includes a second rectifier switching element and a smoothing capacitor; and
   the switching control circuit includes a control circuit arranged and programmed to turn on the first rectifier switching element in response to turning-on of the first switching element, to turn off the first rectifier switching element in response to turning-off of the first switching element, to turn on the second rectifier switching element in response to turning-on of the second switching element, to turn off the second rectifier switching element in response to turning-off of the second switching element, and to continuously hold one of the first and second rectifier switching elements in an on-state even after a current on a secondary side of the transformer has been reduced to be negative with a resonance and to cause the current to be regenerated from an output of the switching power supply apparatus.

2. The switching power supply apparatus according to claim 1, further comprising:
   a first output voltage detection circuit arranged to detect the first output voltage; and a second output voltage detection circuit arranged to detect the second output voltage; wherein given that the first output voltage is Vo1, the second output voltage is Vo1, the on-time of the first switching element is Ton1, the on-time of the second switching element is Tong, a first reference voltage is Vref1, and a second reference voltage is Vref2, the switching control circuit executes, based on a following relationship:

[Math. 5]

$$L\left[\begin{pmatrix} T_{on1} \\ T_{on2} \end{pmatrix}\right] = \begin{pmatrix} A & B \\ C & D \end{pmatrix} L\left[\begin{pmatrix} V_{ref1} - V_{o1} \\ V_{ref2} - V_{o2} \end{pmatrix}\right] \quad (5)$$

where A, B, C and D denote transfer functions, and L denotes Laplace transform, multivariable feedback control of the on-time Ton1 of the first switching element and the on-time Tong of the second switching element in accordance with a detection signal of the first output voltage detection circuit and a detection signal of the second output voltage detection circuit such that the first output voltage Vo1 and the second output voltage Vo1 are held at respective predetermined voltages.

3. The switching power supply apparatus according to claim 2, wherein the transfer function A and the transfer function D are each set to 0.

4. The switching power supply apparatus according to claim 1, wherein the secondary winding includes a single winding that generates the first output voltage and the second output voltage.

5. The switching power supply apparatus according to claim 1, wherein the secondary winding includes a first secondary winding that generates the first output voltage, and a second secondary winding that generates the second output voltage.

6. The switching power supply apparatus according to claim 5, wherein the first secondary winding and the second secondary winding are wound independently of each other, and the first rectifying and smoothing circuit and the second rectifying and smoothing circuit are connected to each other at grounded sides thereof.

7. The switching power supply apparatus according to claim 5, wherein the first secondary winding and the second secondary winding are wound independently of each other, and a grounded side of the first rectifying and smoothing circuit is connected to a voltage output side of the second rectifying and smoothing circuit, or a grounded side of the second rectifying and smoothing circuit is connected to a voltage output side of the first rectifying and smoothing circuit.

8. The switching power supply apparatus according to claim 1, wherein the switching control circuit includes a digital signal processor.

9. A switching power supply apparatus comprising:
a first serial circuit connected to a power supply input portion to which a DC input voltage is input, and including a first switching element on a high side and a second switching element on a low side;
a second serial circuit connected to the power supply input portion to which the DC input voltage is input, and including a third switching element on a high side and a fourth switching element on a low side;
a transformer including at least a primary winding and a secondary winding which are magnetically coupled to each other;

a serial resonance circuit including one end connected to a junction between the first switching element and the second switching element and the other end connected to a junction between the third switching element and the fourth switching element, the serial resonance circuit including the primary winding of the transformer, an inductor, and a capacitor;
a first rectifying and smoothing circuit arranged to rectify and smooth a voltage generated in the secondary winding of the transformer during an on-period of the first switching element and the fourth switching element, and to take out a first output voltage;
a second rectifying and smoothing circuit arranged to rectify and smooth a voltage generated in the secondary winding of the transformer during an on-period of the second switching element and the third switching element, and to take out a second output voltage; and
a switching control circuit arranged and programmed to drive the first and fourth switching elements and the second and third switching elements to be repeatedly turned on/off in a complementary way, and arranged and programmed to control the on-time of the first and fourth switching elements and the on-time of the second and third switching elements in accordance with the first output voltage and the second output voltage, respectively, so as to control the first output voltage and the second output voltage; wherein the first rectifying and smoothing circuit includes a first rectifier switching element and a smoothing capacitor;
the second rectifying and smoothing circuit includes a second rectifier switching element and a smoothing capacitor; and
the switching control circuit includes a control circuit arranged and programmed to:
turn on the first rectifier switching element in response to turning-on of the first switching element, and turn off the first rectifier switching element in response to turning-off of the first switching element;
turn on the second rectifier switching element in response to turning-on of the second switching element, and turn off the second rectifier switching element in response to turning-off of the second switching element; and
continuously hold one of the first and second rectifier switching elements in an on-state even after a current on a secondary side of the transformer has been reduced to be negative with a resonance and to cause the current to be regenerated from an output of the switching power supply apparatus.

10. The switching power supply apparatus according to claim 9, further comprising:
a first output voltage detection circuit arranged to detect the first output voltage; and
a second output voltage detection circuit arranged to detect the second output voltage; wherein
given that the first output voltage is Vo1, the second output voltage is Vo1, the on-time of the first switching element is Ton1, the on-time of the second switching element is Ton2, a first reference voltage is Vref1, and a second reference voltage is Vref2, the switching control circuit executes, based on a following relationship:

[Math. 5]

$$L\left[\begin{pmatrix} T_{on1} \\ T_{on2} \end{pmatrix}\right] = \begin{pmatrix} A & B \\ C & D \end{pmatrix} L\left[\begin{pmatrix} V_{ref1} - V_{o1} \\ V_{ref2} - V_{o2} \end{pmatrix}\right] \quad (5)$$

where A, B, C and D denote transfer functions, and L denotes Laplace transform, multivariable feedback control of the on-time Ton1 of the first switching element and the on-time Ton2 of the second switching element in accordance with a detection signal of the first output voltage detection circuit and a detection signal of the second output voltage detection circuit such that the first output voltage Vo1 and the second output voltage Vo1 are held at respective predetermined voltages.

11. The switching power supply apparatus according to claim 10, wherein the transfer function A and the transfer function D are each set to 0.

12. The switching power supply apparatus according to claim 9, wherein the secondary winding includes a single winding that generates the first output voltage and the second output voltage.

13. The switching power supply apparatus according to claim 9, wherein the secondary winding includes a first secondary winding that generates the first output voltage, and a second secondary winding that generates the second output voltage.

14. The switching power supply apparatus according to claim 13, wherein the first secondary winding and the second secondary winding are wound independently of each other, and the first rectifying and smoothing circuit and the second rectifying and smoothing circuit are connected to each other at grounded sides thereof.

15. The switching power supply apparatus according to claim 13, wherein the first secondary winding and the second secondary winding are wound independently of each other, and a grounded side of the first rectifying and smoothing circuit is connected to a voltage output side of the second rectifying and smoothing circuit, or a grounded side of the second rectifying and smoothing circuit is connected to a voltage output side of the first rectifying and smoothing circuit.

16. The switching power supply apparatus according to claim 9, wherein the switching control circuit includes a digital signal processor.

* * * * *